United States Patent [19]

Robbin et al.

[11] Patent Number: 4,632,453
[45] Date of Patent: Dec. 30, 1986

[54] AUXILIARY SUPPORT SYSTEM FOR BICYCLE PASSENGER

[76] Inventors: John D. Robbin; John W. Robbin, both of 16913-26th SW., Seattle, Wash. 98166

[21] Appl. No.: 660,643

[22] Filed: Oct. 15, 1984

[51] Int. Cl.[4] .............................................. B62J 7/00
[52] U.S. Cl. ................................... 297/243; 280/202; 280/291; 297/195
[58] Field of Search ............... 297/195, 438, 439, 423, 297/243, DIG. 9, DIG. 4; 248/231; 403/338, 191; 280/202, 291, 289; 74/564, 594.6

[56] References Cited

U.S. PATENT DOCUMENTS

| | | |
|---|---|---|
| 365,074 | 6/1887 | Jeffery ............................... 280/291 |
| 409,964 | 8/1889 | Harvey . |
| 556,951 | 3/1896 | Williams et al. ................... 280/202 |
| 579,614 | 3/1897 | Collins . |
| 593,678 | 11/1897 | Neider ............................... 280/291 |
| 2,340,572 | 2/1944 | Smith ............................ 248/231 X |
| 2,376,713 | 5/1945 | Murrell . |
| 2,550,200 | 4/1951 | Murrell . |
| 3,515,431 | 6/1970 | Grady ........................... 297/243 X |
| 3,738,704 | 6/1973 | Smith et al. . |
| 3,743,321 | 7/1973 | Luschen ............................ 280/202 |
| 4,305,532 | 12/1981 | Reminger . |

FOREIGN PATENT DOCUMENTS

| | | | |
|---|---|---|---|
| 715356 | 11/1941 | Fed. Rep. of Germany ...... 280/202 |
| 67605 | 2/1951 | Netherlands ........................ 280/202 |
| 105128 | 7/1942 | Sweden .............................. 280/202 |
| 244495 | 9/1946 | Switzerland ........................ 280/291 |
| 13139 | of 1904 | United Kingdom ................ 280/202 |
| 834948 | 5/1960 | United Kingdom ................ 297/195 |

Primary Examiner—Peter A. Aschenbrenner
Attorney, Agent, or Firm—Christensen, O'Connor, Johnson & Kindness

[57] ABSTRACT

Disclosed is an auxiliary support system for a bicycle passenger. A seat mount assembly (12) is affixed to the horizontal tubular frame member (48) of a bicycle between the primary seat (11) and neck (44). A conventional bicycle seat (56) is attachable to the seat mount assembly. A footrest assembly (14) is attached to the neck (44) of the bicycle frame. The footrest assembly supplies support for the passenger's feet while seated on the auxiliary seat. Quick-release harnesses (17) are incorporated into the footrest assembly in order to safely secure the passenger's feet adjacent to the footrest assembly.

10 Claims, 6 Drawing Figures

AUXILIARY SUPPORT SYSTEM FOR BICYCLE PASSENGER

BACKGROUND OF THE INVENTION

This invention relates to a system that is attachable to a conventional bicycle for safely carrying a bicycle passenger, especially a child of preschool age.

It is well known in the art to provide auxiliary seats or carriers to standard bicycle frames. For example Collins, U.S. Pat. No. 579,514, Reminger, U.S. Pat. No. 4,305,532 and Murrell, U.S. Pat. No. 2,559,200, all disclose some type of seat or carrier means mounted to the upper horizontal tubular frame member of a standard bicycle. In these patents, the auxiliary seats have platform-like bottom portions mounted in various manners to rest directly upon the upper horizontal frame member of the bicycle. These auxiliary seats must utilize seat designs that are quite unlike the conventional bicycle seats that are commonly available. Furthermore, because of the proximity of the auxiliary seat to the knees of the primary rider of the bicycle, the rider must adjust his normal pedalling motion to avoid striking or scraping the seat or the passenger with his knee.

In transporting small children in an auxiliary seat it is important that the child resist the somewhat dangerous, albeit natural, tendency to touch his or her toe to the moving front wheel or spokes. Additionally, a child's free-swinging feet can interfere with steering the bicycle and be more likely to be injured in the event of a sliding fall.

With the above-noted problems in mind, this invention provides for an auxiliary support system for a bicycle passenger wherein a seat mount assembly can be quickly and easily clamped to the horizontal tubular member of the bicycle frame and provide a mounting post upon which a conventional bicycle seat can be mounted. The entire seat mount assembly is only slightly larger than the horizontal frame member and provides for positioning a conventionally designed auxiliary seat up and away from the frame member, so that the normal pedalling motion of the rider is not impeded.

The support system of the present invention combines with the seat mount assembly a footrest assembly that can be quickly and easily attached to the vertical neck portion of a bicycle frame that supports the fork. The child's feet are supported on the footrest assembly up and away from the legs of the rider. Furthermore, harnesses are supplied which adjustably secure the foot of the passenger to the footrest assembly so that the child can safely retain his balance while being prevented from unsafely dangling his feet.

SUMMARY OF THE INVENTION

The present invention provides an auxiliary support system for a bicycle passenger wherein the bicycle has a substantially vertical tubular neck in which the fork supporting the front wheel is mounted, a substantially horizontal tubular frame member joined to the neck at the upper end of the neck and extending to the vicinity of the primary seat, and an inclined tubular frame member joined to the neck at the lower end of the neck and extending to the vicinity of the bicycle pedals.

The invention particularly comprises:

a footrest assembly attachable to the neck, and including an elongated support element. The footrest assembly is constructed and arranged so that the elongated support element extends substantially orthogonally to the longitudinal axis of the neck when the footrest assembly is attached to the neck;

a harness attached to the support element for securing the passenger's feet adjacent to the support element; and a seat mount assembly mountable to the horizontal tubular frame member for affixing an auxiliary bicycle seat thereto.

BRIEF DESCRIPTION OF THE DRAWINGS

The invention can best be understood by referring to the following portion of the specification taken in conjunction with the accompanying drawings in which.

DETAILED DESCRIPTION OF THE INVENTION

Figure 1:
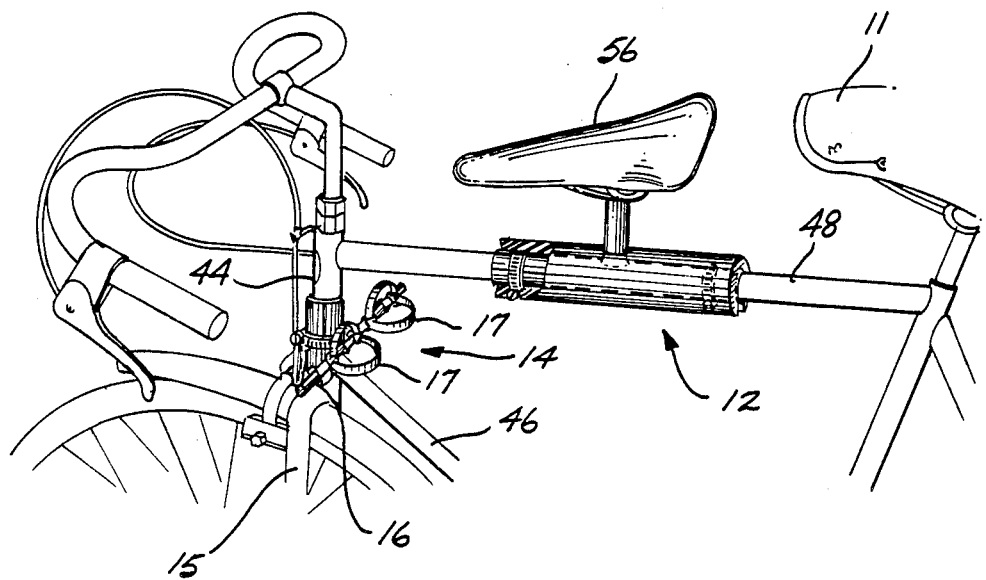
FIG. 1 is a pictorial illustration of the preferred embodiment of the invention.

With reference to FIG. 1, the illustrated bicycle historically has been called a man's or boy's bicycle; however, the significant distinction of this bicycle over others is the fact that there is a horizontal tubular frame member 48 that extends from the upper end of neck 44 of the bicycle to the vicinity of the primary seat 11. The preferred embodiment of this invention is directed toward this type of bicycle construction and includes a seat mount assembly 12 affixed to the horizontal tubular frame member 48. An auxiliary bicycle seat 56 of conventional design is attached to the seat mount assembly. A footrest assembly 14 is provided so that the passenger, typically a child of preschool age, will be comfortably supported as he or she rides on auxiliary seat 56. Harnesses are incorporated into the footrest assembly to secure the child's feet to the footrest.

Figure 3:
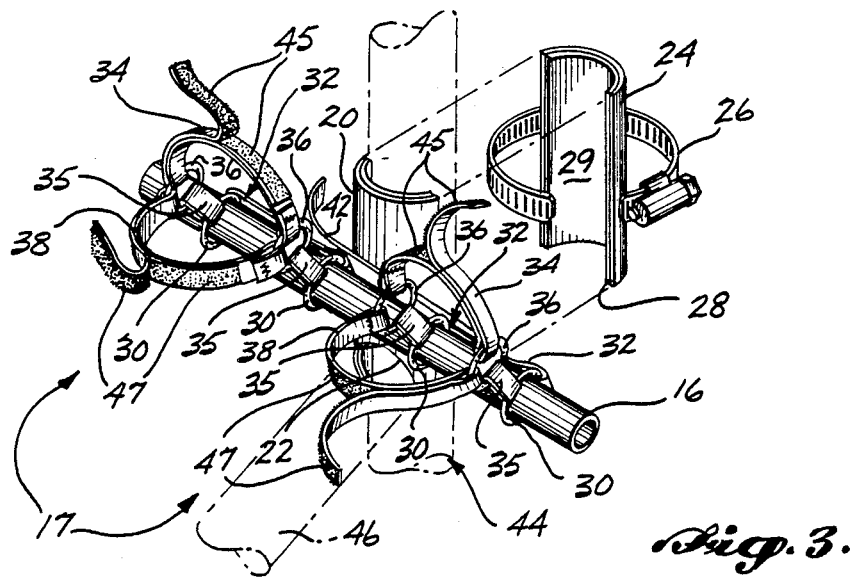
FIG. 3 is a first isometric view of the footrest assembly.
Figure 4:
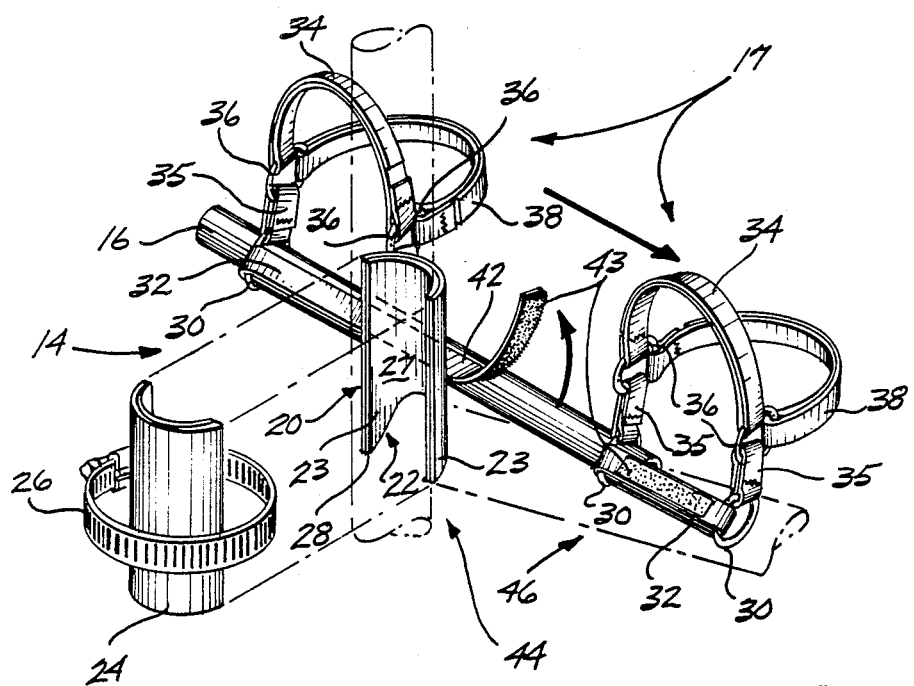
FIG. 4 is a second isometric view of the footrest assembly, rotated 180° about a vertical axis from the view of FIG. 3.

With reference to FIGS. 3 and 4 the particulars of the footrest assembly 14 can best be described. An elongated support tube 16 is attached to a semitubular shaped first clamp element 20. The support tube 16 is attached to the convex side of the first clamp element 20 and extends substantially orthogonally to the longitudinal axis of the first clamp element. A pair of tapered edge projections 23 extend from one longitudinal end of the first clamp element 20 and define a U-shaped groove 22 in that end. The inner concave surface 27 of the first clamp element 20 is lined with a layer of resilient high-friction material 28 such as synthetic rubber.

Harnesses 17 for the left and right foot of the passenger are mounted on the support tube 16. Specifically, each harness comprises a flat base strap 32, made of durable material such as canvas, attached at its ends between a pair of mounting rings 30. The mounting rings 30 are annular shaped and have inside diameters slightly greater than the outside diameter of the support tube 16. One pair of mounting rings 30 slides over each end of the support tube 16. A flat, elongated connecting strap 42, preferably formed of the same material as base straps 32, extends across the substantial length of the support tube 16 and is fastened at each end to the base strap 32 of each harness 17. For ease in removing the harnesses from the support tube 16 for cleaning or repair, one end of the connecting strap 42 and one of the base straps 32 incorporate a quick-release hook-and-pile type fastener 43. The harnesses 17 can then be quickly separated by hand and slid off of the support tube 16.

A canvas extension strap 35 is slidably connected at one end to each mounting ring 30. Each opposing end of each extension strap 35 is slidably connected to one of a pair of junction rings 36. A canvas instep strap 34 is slidably fastened at one end to one of the junction rings 36. The other end of the instep strap 34 extends through the other junction ring 36 and then is folded back to be fastened to itself with quick-release hook-and-pile type fasteners 45. A canvas heel strap 38 is connected to the junction rings 36 in an identical manner as that of the instep strap 34. That is, one end of the heel strap 38 is slidably attached to a junction ring 36 while the other end passes through the other junction ring 36 and is folded back to be releasably fastened to itself by fasteners 47.

Figure 2:
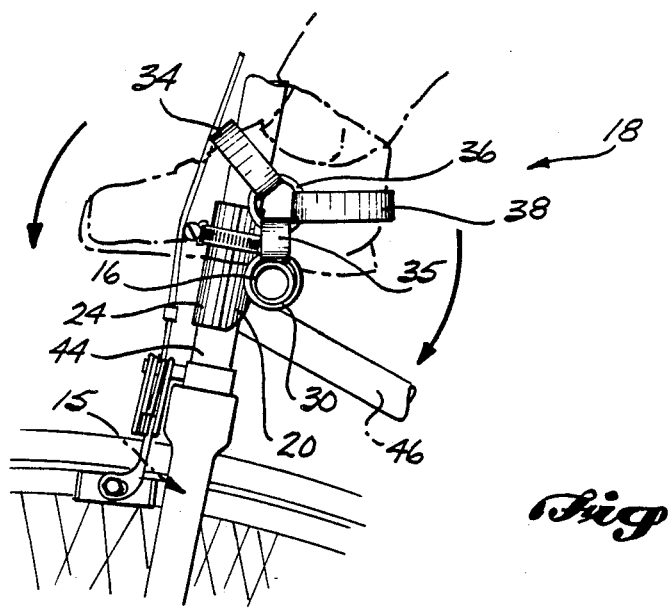
FIG. 2 is a side elevational view of a footrest assembly of the preferred embodiment.

When the support tube 16 is properly secured to the bicycle (as described later), the harnesses 17 constructed in accordance with this invention provide for the insertion of the child's foot between mounting rings 30. As shown in FIG. 2, the instep strap 34 is adjusted to snugly fit over the instep of the child's foot 18 and the heel strap 38 is adjusted to wrap snugly around the back of the child's foot. Since mounting rings 30 are of slightly larger diameter than the diameter of support tube 16, and because the extension straps 35, instep straps 34, and heel straps 38 are all slidably connected to junction rings 36, the child's feet and ankles are free to rotate about (but not move away from) the support tube 16. Furthermore, since connecting strap 42 is formed of nonrigid material, the child's feet can be slid along the length of the support tube 16 between the first clamp element 20 and the outside ends of the support tube. The length of connecting strap 42 is such that mounting rings 30 cannot be slid off of the support tube 16 unless hook-and-pile type fastener 43 is released.

With reference to FIGS. 1, 3 and 4, the support tube 16 and harnesses 17 are fastened to the substantially vertical tubular extension or neck 44 of the bicycle frame which receives the fork 15 that supports the front wheel. When properly positioned on the bicycle the inner concave surface 27 of first clamp element 20 is placed up against the side of the neck 44. A conventional bicycle frame features an inclined tubular frame member 46 that is joined to the neck at the lower end of the neck and extends to the vicinity of the bicycle pedals (not shown). The U-shaped groove 22 in the end of the first clamp element 20 fits over the top portion of the inclined tubular frame member 46 at the point where the inclined tubular frame member 46 joins the neck 44 of the bicycle frame. A semitubular-shaped second clamp element 24 is utilized to secure the first clamp element 20 to the neck 44 of the bicycle frame. Specifically, the inner concave surface 29 of the second clamp element 24 is placed against the neck 44 of the bicycle frame on the opposing side of the neck so that the two semitubular clamp elements 20 and 24 substantially enclose the entire circumference of the tubular neck 44. Clamp elements 20 and 24 are joined together by suitable means such as the hose clamp 26 of the preferred embodiment. The inner concave surface 29 of the second clamp element is also lined with the resilient high-friction material 28. This material protects the finish on the neck portion 44 and also inhibits slipping or rotating of the clamp when it is secured in position.

When U-shaped groove 22 is positioned to fit over the inclined tubular frame member 46, edge projections 23 straddle the side portions of the inclined tubular frame member. First clamp element 20 is thus prevented from rotating about the longitudinal axis of the neck 44 since its edge projections 23 are abutted against the side of the inclined tubular frame member 46. When the footrest assembly is attached to the neck 44 as just described, support tube 16 extends substantially orthogonal to the longitudinal axis of the neck 44.

Figure 5:
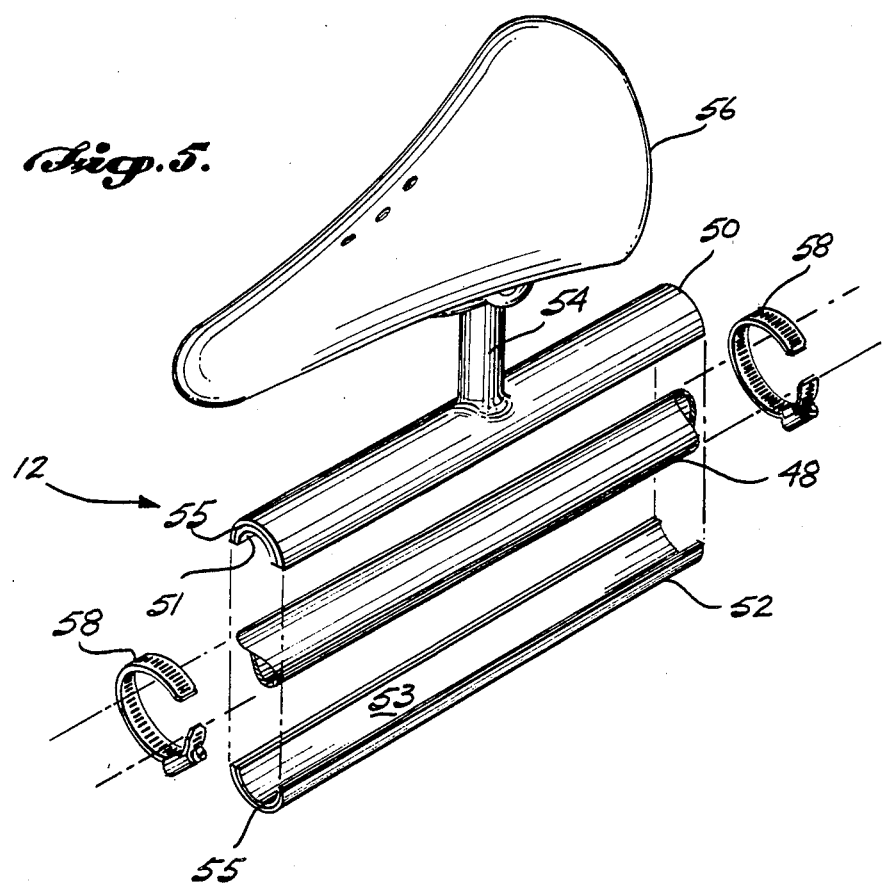
FIG. 5 is an isometric view of a seat mount assembly of the preferred embodiment.
Figure 6:
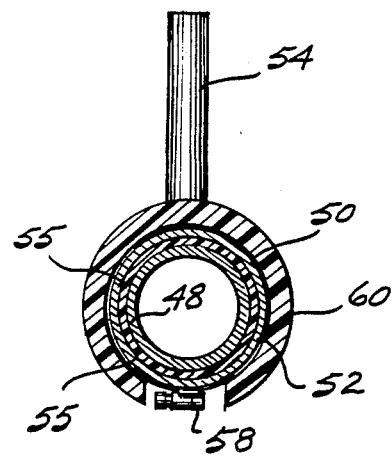
FIG. 6 is an end view of the seat mount assembly.

With reference to FIGS. 5 and 6 the seat mount assembly 12 can best be described. The assembly comprises a semitubular shaped first clamp member 50 and a semitubular shaped second clamp member 52 that are placed together to substantially envelop the circumference of the horizontal tubular frame member 48. The inner concave surfaces 51 and 53 of the first and second clamp members 50 and 52 that engage the horizontal tubular frame member 48 are lined with a resilient, high-friction material such as synthetic rubber 55 in order to protect the finish of the bicycle and prevent slippage of the seat mount assembly. Clamp members 50 and 52 are securely held in position by suitable means such as the pair of hose clamps 58 of the preferred embodiment. Projecting upwardly from, and integrally formed with, the first clamp member 50 is a tubular seat post 54. The diameter of the seat post 54 is of a size to accommodate a conventional bicycle seat 56 (not shown in FIG. 6). A tubular-shaped cover piece 60 (not shown in FIG. 5) made of resilient foam-like material can be formed to wrap around a substantial portion of the clamp members 50 and 52 and hose clamps 58. Cover 60 is essentially for aesthetic purposes.

It can be appreciated that the footrest assembly formed in accordance with this invention provides a stable balancing support for a child's feet so that a relatively narrow conventional bicycle seat may be used in conjunction with the support system of this invention. When the child's feet are strapped in the harnesses of the footrest assembly, the child is in a more secure position should the bicycle fall over. Furthermore, the unobtrusive seat mount assembly provides a quick and convenient method of mounting the conventional seat 56 in a position where it is least likely to interfere with the pedalling action of the rider.

While the invention has been described with reference to a preferred embodiment it is to be clearly understood by those skilled in the art that the invention is not limited thereto; rather, the scope of the invention is to be interpreted only in conjunction with the appended claims.

The embodiments of the invention in which an exclusive property or privilege is claimed are defined as follows:

1. An auxiliary support system for a bicycle passssenger wherein the bicycle has a substantially vertical tubular neck in which the fork supporting the front wheel is mounted, a substantially horizontal tubular frame member joined to the neck at the upper end of the neck and extending to the vicinity of the primary seat, and an inclined tubular frame member joined to the neck at the lower end of the neck and extending to the vicinity of the bicycle pedals, comprising:

a footrest assembly attachable to the neck and including an elongated support element, the footrest assembly being constructed and arranged so that the elongated support element extends substantially orthogonally to the longitudinal axis of the neck when the footrest assembly is attached to the neck;

harness means attached to the support element for securing the passenger's feet adjacent to the support element, the harness means comprising:

two pairs of mounting devices, one pair slidably attached to the support element at each end thereof:

a pair of base straps, each base strap connected at its ends between one pair of the mounting devices;

two pairs of extension straps, one extension strap connected at one end to each mounting device;

a pair of instep straps, each instep strap connected to extend between one pair of the extension straps at each end of the support element, the instep straps having adjustment means for adjusting their length between the extension straps, the instep straps being configured and arranged to secure the instep portion of the passenger's foot adjacent to the support element;

a pair of heel straps, each heel strap connected to extend between the extension straps between points proximal to where the extension straps connect to the instep straps, the heel straps having adjustment means for adjusting their length between the extension straps, the heel straps configured and arranged to secure the heel portion of a passenger's foot adjacent to the support element; and a connector strap adjustably attached between the pair of base straps for connecting the base straps together in slidable movement about the support element; and a seat mount assembly mountable to the horizontal tubular frame member for affixing an auxiliary bicycle seat thereto.

2. The support system of claim 1 wherein the footrest assembly further comprises:

a first clamp element integrally formed with the support element, the first clamp element being semitubular-shaped and having an inner concave surface, the first clamp element also having at least one longitudinal edge portion with a U-shaped groove formed therein, the concave surface of the first clamp element engageable with a portion of the bicycle neck proximal to the junction of the neck with the inclined tubular frame member, the U-shaped groove in the edge portion of the first clamp element fitting over the inclined tubular frame member so that the first clamp element is prevented from sliding movement about the longitudinal axis of the neck;

a semitubular-shaped second clamp element having an inner concave surface engageable with the neck adjacent the first clamp element; and clamp element joining means for securing the first and second clamp elements together about the neck.

3. The support system of claim 2 wherein the seat mount assembly includes clamp means for clamping the seat mount assembly to the substantially horizontal tubular frame member of the bicycle, the clamp means including two semitubular clamp members having concave inner surfaces and being joinable to securely envelop a portion of the circumference of the substantially horizontal tubular frame member, the seat mount assembly also including clamp member joining means for securing the two semitubular clamp members to the substantially horizontal tubular frame member, the seat mount assembly further including a cylindrical post integrally formed on one clamp member for mounting a conventional bicycle seat thereto.

4. The support system of claim 3 wherein the support element is a rigid tube, the mounting devices being rings slidable over the outside diameter of the support element, the rings allowing swiveling movement between the extension straps and the support element.

5. The support system of claim 4 wherein each heel strap and instep strap are connected to an extension strap by rings, the rings allowing swiveling movement between the heel straps and the instep straps at the point where those straps connect to the extension straps.

6. The support system of claim 5 wherein the concave surfaces of the first and second clamp elements are lined with resilient, high-friction material.

7. The support system of claim 6 wherein the inner concave surface of the clamp members is lined with resilient, high-friction material.

8. The support system of claim 2 wherein the joining means are hose clamps.

9. The support system of claim 3 wherein the clamp member joining means are hose clamps.

10. The support system of claim 9 wherein the clamp means further includes a resilient cover surrounding a substantial portion of the clamp members and clamp member joining means.

* * * * *